United States Patent [19]

Minami et al.

[11] Patent Number: 4,563,488
[45] Date of Patent: Jan. 7, 1986

[54] INSULATOR WITH HIGH THERMAL CONDUCTIVITY

[75] Inventors: Akinori Minami; Katsuyoshi Yamauchi, both of Moriyama, Japan

[73] Assignee: Japan Vilene Co. Ltd., Tokyo, Japan

[21] Appl. No.: 642,415

[22] Filed: Aug. 20, 1984

[51] Int. Cl.$^4$ .............................. C08K 3/38; C08K 3/34
[52] U.S. Cl. ...................... 523/222; 523/223; 524/404; 524/428; 524/430; 524/432; 524/433; 524/449; 524/520; 524/506; 264/175
[58] Field of Search ............... 523/222, 223; 524/430, 524/432, 433, 449, 404, 428, 520, 506; 264/175

[56] References Cited

U.S. PATENT DOCUMENTS 2,710,290  6/1955  Safford et al. .................. 524/506
2,927,908  3/1960  Konkle et al. .................. 524/506

FOREIGN PATENT DOCUMENTS 53-46342  4/1978  Japan ............................. 524/520
54-61253  5/1979  Japan ............................. 524/404

Primary Examiner—Lewis T. Jacobs
Attorney, Agent, or Firm—Pahl, Lorusso & Loud

[57] ABSTRACT

A material with high thermal conductivity for insulating electronic parts is formed by exposure to a compressive shearing force of a compound containing 50 to 95% by volume heat conductive, inorganic powder and 5 to 50% by volume bonding agent. The bonding agent contains at least 0.2 to 30% by volume polytetrafluoroethylene (PTFE), preferably 1.0 to 20%, and synthetic rubber, where the volume ratio of rubber is $\frac{1}{4}$ or more of the PTFE. The compressive shearing force fibrillates the PTFE and disperses the inorganic powder so that there is an even aggregation of heat conductive material. Other ingredients such as vulcanizing agents, vulcanizing accelerators, stabilizers, processing aids, flame retardents, coloring agents, and solvents may be added. The material may be reinforced with a woven or nonwoven fabric or staple fibers.

24 Claims, No Drawings

INSULATOR WITH HIGH THERMAL CONDUCTIVITY

The present invention relates to an insulating material with high thermal conductivity to be used mainly as an insulator between electronic parts and a heat radiator.

BACKGROUND OF THE INVENTION

The recent development of small and compact electronic parts such as semiconductor elements has created a need for electrical insulating materials with particular properties. Some electronic parts such as power transistors and thyristors, in particular, are liable to be damaged by or to deteriorate from the heat generated during operation. Accordingly, these electronic parts are usually protected by heat radiating, finned metal plates which are attached to the electronic parts through an insulating sheet of high thermal conductivity.

Conventionally, mica sheets and polyester films have been used to make these insulating sheets. Grease is applied to these insulators to ensure close adhesion of the insulators to the electronic parts. Even though these materials are inexpensive and therefore desirable in terms of cost, their thermal conductivity is insufficient. Furthermore, the application of grease to the insulating material is troublesome and likely to flow out or deteriorate due to heat. The use of those conventional sheets or films has, therefore, not been satisfactory.

Insulating materials made of a synthetic rubber containing heat conductive powder, such as alumina or zinc white powder, as a filler are also known. With such materials, the heat conductivity can be enhanced by increasing the volume ratio of the heat conductive inorganic powder to the insulator. Unfortunately, increasing the volume ratio of the filler usually decreases moldability and mechanical strength of the insulator. In addition, the insulating material becomes brittle and cracks when bent when the amount of filler in the insulator is increased. As a result, in practical applications using a synthetic rubber insulator containing an inorganic powder, the volume ratio of the powder to insulator cannot be increased enough to yield a satisfactory thermal conductivity.

A synthetic rubber insulator incorporating a woven or nonwoven fabric or staple fibers has also been proposed. The incorporation of a woven or non-woven fabric or staple fibers into the insulating sheet improves the strength of the sheet. However, because the volume ratio of filler to insulator cannot be increased, the thermal conductivity of the sheet is not necessarily satisfactory.

It is, therefore, an object of the present invention to provide an electrically insulating material with high thermal conductivity which can be placed between electronic parts and a heat radiator.

It is a further object of the present invention to provide an insulating material which is flexible, strong, and can be posititioned around electrical parts without difficulty.

It is still further object of the present invention to provide an insulating material which can contain a high percentage by volume of heat conductive inorganic powder to bonding agent.

Another object of the present invention is to provide an insulating material which can be further strengthened by reinforcement with woven or non-woven fabric or staple fibers.

Based on the fact that polytetrafluoroethylene resin, hereinafter referred to as "PTFE", can easily be fibrillated by an applied compressive shearing force, the present invention comprising an insulating material made of heat conductive inorganic powder held together by a bonding agent containing fibrillated PTFE and synthetic rubber was developed wherein the volume ratio of inorganic powder filler to bonding agent can be increased to an extremely high value.

SUMMARY OF THE INVENTION

The present invention provides an insulating material of high thermal conductivity which is formed of a compound comprising 50 to 95% by volume heat-conductive inorganic powder and 5 to 50% by volume bonding agent, wherein the bonding agent contains at least 0.2 to 30% by volume PTFE, preferably 1.0 to 20% by volume, and synthetic rubber in a volume ratio of rubber is $\frac{1}{4}$ or more of the PTFE. The powder is dispersed into and held by the bonding agent when the PTFE is fibrillated by a compressive shearing force.

DETAILED DESCRIPTION OF THE INVENTION

Heat conductive inorganic powders applicable to the present invention are those which are electrically insulating such as aluminum oxide, zinc oxide, magnesium oxide, beryllium oxide, silica, mica, boron nitride and alumina nitride. Those powders are used individually or in combination.

The particle size and the configuration of the powder are not particularly limited, however, spherical particles of 0.2 to 100 microns are preferable for facilitation of the sheet forming process.

The preferred percentage of inorganic powder in a compound according to the present invention is as high as 50 to 95% by volume. When the ratio is less than 50% by volume, the thermal conductivity of the insulating sheet is insufficient. When the ratio is greater than 95% by volume, the mechanical strength of the insulating sheet is reduced.

Although various types of PTFE are useful in the present invention, PTFE obtained through an emulsion polymerization process is preferred. For example, PTFE powder obtained by aggregating fine particles of 0.2 microns or an aqueous dispersion of 0.2 micron particles may be used.

A mixture of PTFE and a synthetic rubber is used as a bonding agent for the inorganic powder particles.

Synthetic rubbers applicable to the present invention are heat-resistant and electrically insulating rubber-like elastomers such as silicone rubber, fluororubber, acrylic rubber and chlorosulfonic polyethylene. Among these synthetic rubbers, highly workable silicone rubber is preferred.

The percentage of the bonding agent in the insulating sheet of the present invention is at least 5% by volume. The bonding agent contains a mixture of PTFE and a synthetic rubber, as mentioned above, and, if desired, a vulcanizing agent, a vulcanizing accelerator, coloring matter, and an aging resistor.

The content of PTFE in the compound is 0.2 to 30% by volume, preferably, 1.0 to 20% by volume. When the content of PTFE is less than 0.2% by volume, the mechanical strength and the flexibility of the sheet are insufficient and the sheet becomes more brittle and fragile as the percent volume ratio of the inorganic powder to bonding agent is increased. When the content of PTFE is greater than 30% by volume, the cohesion of PTFE increases excessively, causing the final product which may be in a sheet form, for example, to become stiff and incapable of close adherence to the electronic parts.

On the other hand, the requisite volume ratio of the synthetic rubber is ¼ or more of the volume of the PTFE. If the volume ratio of the synthetic rubber to PTFE is less than ¼, the sheet becomes excessively stiff and incapable of close contact to the electronic parts to be insulated.

When a compound of PTFE and a synthetic rubber of the above-mentioned desirable composition is subjected to a kneading process, the PTFE is readily fibrillated by the compressive shearing force. The particles of inorganic powder are entangled in and securely held by the fibrillated PTFE. The preferred embodiment of the invention, therefore, comprises a well kneaded compound in which the inorganic powder particles are securely retained by the fibrillated PTFE.

According to the present invention, a mixture of inorganic powder, bonding agent comprising PTFE and synthetic rubber, and other agents, if desired, is kneaded by a kneading machine, such as a mixing and stirring machine, a kneader, a ball mill, a Banburry mixer, a roller mill or a screw mixer. The kneading process disperses the ingredients of the compound uniformly in the mixture and fibrillates the PTFE. The fibrillation of PTFE facilitates and simplifies the following pressing and calendering processes.

The timing of the fibrillation of PTFE is not a particular constraint. According to the present invention, PTFE may first be fibrillated by a compressive shearing force, then mixed with the inorganic powder and the synthetic rubber. Alternatively, the PTFE and inorganic powder may first be kneaded to fibrillate the PTFE, then mixed with synthetic rubber. Or, all the ingredients: inorganic powder, PTFE, synthetic rubber and other ingredients, may be subjected to the kneading process together. Other ingredients of the compound may include vulcanizing agents, a vulcanizing accelerator, a stabilizer, a processing aid, a flame retardent, coloring agent and a solvent, and may be added during kneading as occasion demands.

The kneaded compound is formed into a sheet or a shell-shaped material by a calendering machine, an extruder, a knife coater or a press. As referred to herein, sheets include flat sheets and three-dimensional molded thin materials, such as pipes, formed of thin walls of the compound. Kneading and sheet-forming may be performed in a single process or in separate processes depending on the type of machines employed. The sheet formed by processing a kneaded compound is more flexible and has higher mechanical strength than a conventional sheet, in spite of the high filling density of the inorganic powder, and has excellent thermal conductivity.

A flat sheet with increased strength is obtained by rolling the sheet of kneaded compound using a plurality of calender rollers rotating at different circumferential speeds. Repeated rolling by folding the sheet and changing the direction of rolling subjects the PTFE to an increased compressive shearing force. Using this process, a homogeneous sheet having few or no voids is obtained and the mechanical strength of the sheet is improved due to the enhanced filbrillation of the PTFE.

Optimum results are obtained when the ratio of circumferential speed between the corresponding calender rollers is 1.1 to 3. The desirable temperature of the rollers is 20° C. or higher. 50° C. or higher is preferable for ready filbrillation of PTFE. However, the temperature of the rollers is limited to a temperature less than the bridge forming temperature of the synthetic rubber contained in the compound.

Appropriate rolling pressure is approximately 1 to 50 kg/cm$^2$. Excessively high rolling pressure is not desirable because it hardens the sheet, thereby reducing the flexibility.

Rolling a sheet rolled in one direction in a direction perpendicular to the previous rolling direction further improves the dispersion of the ingredients and averages the longitudinal and the lateral mechanical strengths of the sheet advantageously. Naturally, if necessary, the sheet may be rolled by folding the sheet at a fixed angle.

The sheet thus formed through the repeated rolling process is subjected to a vulcanizing and bridge-forming process under heat and pressure to produce an insulating sheet with excellent properties. The insulating sheet may be reinforced with a reinforcing material, such as a woven or non-woven fabric, a net or yarn, if necessary. Futhermore, the kneaded compound may be molded in a three-dimensional shell such as a pipe.

The physical properties of the insulating sheet obtained by the described process were evaluated using the following methods.

(1) Measurement of Thermal Resistance

A sample sheet of 0.04 mm thickness was placed between a power transistor (2SD-428, type TO-3) and a heat radiating fin (type H, 6cm × 12cm) and was clamped in place using a clamping torque of 5 kg/cm. An electric current of 2A × 10V was applied to the sheet to measure the thermal resistance (°C/Watt) of the sheet.

The smaller the thermal resistance, the higher the thermal conductivity. As a result, when the thermal resistance is 0.5° C/Watt or below, the heat radiating performance is satisfactory.

(2) Measurement of Tensile Strength

The tensile strength of the sheet was measured using a Tensilon tension tester according to JIS K6301.

A tensile strength of 30 kg/cm$^2$ or greater is required for the sheet to be useful for practical application.

(3) Measurement of Bending Strength

Test pieces of 0.40 mm thickness and 3 cm × 20 cm area were subjected to a bending test on a Karl Frank bending tester. The upper end of the test piece was held by the clamp and the lower end of the test piece was attached to a load table of 1 kg and the test piece was bent repeatedly through an angle of 180°. The number of bending cycles until the test piece was broken was counted.

A bending strength of 200 times or more indicates that the sheet is extremely flexible and therefore desirable. A bending strength of 10 times or fewer indicates that the sheet is brittle and fragile, and hence is not applicable for practical use.

EXAMPLES 1 to 10

Mixtures of a fine powder of Teflon 6J (trade name of PTFE produced by Mitsui Phlorochemical), alumina powder of 30 micron particle size and dimethylvinyl silicone rubber were kneaded to prepare compounds with different mixing ratios. To each of those compounds. 1.5 wt% of a peroxide, based on the silicone rubber, was added as a vulcanizing agent. The mixing ratios of these compounds are shown in Table 1. Each of these compounds was kneaded by a kneader, rolled on a two-roller rolling machine, and then rolled four times between rollers rotating at a ratio of circumferential speed of 1:1.5 and heated to a temperature of 60° C. to produce a sheet with a thickness of 0.4 mm. The sheet thus produced was vulcanized at a temperature of 150° C. to finish it as an insulating sheet.

process as for example 7 to form sheets of 0.4 mm thickness.

EXAMPLE 19

In Example 19, an insulating sheet of 0.4 mm thickness was formed as in example 7, which was prepared according to the process of the present invention with 10% by volume PTFE, 70% by volume alumina, and 20% by volume silicone rubber, except that boron nitride powder of 25 micron particle size was substituted for the alumina.

The mixing ratios of the ingredients and the physical properties of examples 17–19 are shown in Table 2.

TABLE 1

| Ex-ample | Mixing Ratio (Volume %) | | | Heat Resistance (°C./W) | Tensile Strength (Kg/cm$^2$) | Bending Strength (Times) |
| --- | --- | --- | --- | --- | --- | --- |
| | PTFE | Alumina | Silicone Rubber | | | |
| 11 | 0 | 30 | 70 | 1.28 | 54.0 | >200 |
| 1 | 2 | 55 | 43 | 0.47 | 53.6 | >200 |
| 2 | 8 | 55 | 37 | 0.47 | 94.2 | >200 |
| 3 | 18 | 55 | 27 | 0.49 | 102.5 | >200 |
| 12 | 40 | 55 | 5 | 1.34 | 138.0 | >200 |
| 13 | 0 | 64 | 36 | 0.49 | 26.5 | 3 |
| 4 | 6 | 64 | 30 | 0.40 | 82.0 | >200 |
| 5 | 10 | 64 | 26 | 0.38 | 98.3 | >200 |
| 14 | 32 | 68 | 0 | 1.06 | 110.6 | >200 |
| 15 | 0 | 70 | 30 | 0.48 | 20.6 | 1 |
| 6 | 7 | 70 | 23 | 0.34 | 65.0 | >200 |
| 7 | 10 | 70 | 20 | 0.35 | 73.8 | >200 |
| 16 | 27 | 73 | 0 | 0.92 | 97.5 | >200 |
| 8 | 6 | 82 | 12 | 0.33 | 48.7 | >200 |
| 9 | 6 | 85 | 9 | 0.31 | 39.5 | >200 |
| 10 | 5 | 92 | 3 | 0.34 | 31.0 | 112 |

EXAMPLES 11 to 16

For comparison, insulating sheets of 0.4 mm thickness containing no PTFE (Nos. 11, 13, and 15), containing more than 30% by volume of PTFE (Nos. 12 and 14), and containing silicone rubber of PTFE in a volume ratio of not more than ¼ (Nos. 12, 14 and 16) were prepared using the same manufacturing process as in Examples 1–10.

The mixing ratios of the ingredients and the physical properties of the products are shown in Table 1.

EXAMPLES 17 and 18

For further comparison, the product in example 17 was prepared by substituting fluorofibers of 3 denier thickness and 15 mm fiber length for the PTFE of example 7, which was prepared according to the process of the present invention with 10% by volume PTFE, 70% by volume alumina, and 20% by volume silicone rubber. Also for comparison, Example 18 was prepared by substituting glass fibers of 25 micron diameter and 15 mm fiber length for the PTFE of example 7. Examples 17 and 18 were processed using the same manufacturing

TABLE 2

| Example | Mixing Ratio (Volume %) | | | | Heat Resistance (°C./W) | Tensile Strength (Kg/cm$^2$) | Bending Strength (Times) |
| --- | --- | --- | --- | --- | --- | --- | --- |
| | PTFE | Alumina | Silicone Rubber | Others | | | |
| 7 | 10 | 70 | 20 | — | 0.35 | 73.8 | >200 |
| 17 | — | 70 | 20 | fluoro-fiber 10 | 1.10 | 27.5 | 3 |
| 18 | — | 70 | 20 | glass fiber 10 | 1.20 | 21.6 | 3 |
| 9 | 10 | — | 20 | boron nitride 70 | 0.27 | 46.0 | 160 |

Since the insulating material of the present invention has excellent heat-radiative properties, it is especially useful for insulating electronic parts. The same insulating sheet is also applicable for use as heat-radiative insulating material for thermal fuses and thermal sensors, and as heat-radiative spacers for heat pipes.

Although this invention has been described with reference to specific embodiments, it is understood that modifications and variations may occur to those skilled in the art. It is intended that all such modifications and variations be included within the scope of the appended claims.

What is claimed is:

1. An insulating material of high thermal conductivity comprising:
    60 to 95% by volume heat conductive inorganic powder comprising spherical particles and 5 to 50% by volume bonding agent comprising 0.2 to 30% by volume polytetrafluoroethylene resin, and synthetic rubber, and wherein the volume of rubber is ¼ or more of the volume of polytetrafluoroethylene.

2. The insulating material of claim 1 wherein the heat conductive inorganic powder is electrically insulating.

3. The insulating material of claim 2 wherein the heat conductive inorganic powder is selected from the group consisting of aluminum oxide, zinc oxide, magnesium oxide, beryllium oxide, silica, mica, boron nitride, and aluminum nitride.

4. The insulating material of claim 1 wherein the heat conductive inorganic powder is in the form of spherical particles with a diameter of 0.2 to 100 microns.

5. The insulating material of claim 1 wherein the bonding agent comprises 1.0 to 20% by volume polytetrafluoroethylene resin.

6. The insulating material of claim 1 wherein the polytetrafluoroethylene is fibrillated.

7. The insulating material of claim 1 wherein the synthetic rubber is an electrically insulating elastomer.

8. The insulating material of claim 7 wherein the rubber is selected from the group consisting of silicone rubber, fluororubber, acrylic rubber, and chlorosulfonic polyethylene.

9. The insulating material of high thermal conductivity of claim 1 further comprising at least one agent selected from the group consisting of vulcanizing agents, vulcanizing accelerators, coloring agents, stabilizers, processing aids, flame retardents, and solvents.

10. The insulating material of claim 1 wherein the material is exposed to a compressive shearing force.

11. The insulating material of claim 10 wherein the material is rolled into a sheet.

12. The insulating material of claim 1 reinforced with a material selected from the group consisting of woven material, nonwoven material, and staple fibers.

13. The insulating material of claim 10 wherein the material is molded into a three-dimensional object.

14. The insulating material of claim 10 wherein the material is subjected to a vulcanizing process.

15. A process for making an insulating material comprising mixing heat conductive inorganic powder with a bonding agent containing polytetrafluoroethylene and a synthetic rubber, wherein the polytetrafluoroethylene is fibrillated by a compressive shearing force.

16. The process according to claim 15 wherein the polytetrafluoroethylene is fibrillated prior to mixing with the inorganic powder and synthetic rubber.

17. The process according to claim 15 wherein the polytetrafluoroethylene is fibrillated and mixed with the inorganic powder, then mixed with the synthetic rubber.

18. The process according to claim 15 further comprising mixing in ingredients selected from the group consisting of vulcanizing agents, vulcanizing accelerators, stabilizers, processing aids, flame retardents, coloring agents, and solvents.

19. The process according to claim 15 further comprising forming a sheet from the mixture.

20. The process according to claim 19 wherein the sheet is formed by rolling material between rollers rotating at different circumferential speeds.

21. The process according to claim 20 further comprising heating the rollers to between 20° and 50° C.

22. The process according to claim 15 further comprising reinforcing the mixture with a material selected from the group consisting of woven material, nonwoven material, and staple fibers.

23. The process according to claim 15 further comprising molding the mixture into a three dimensional object.

24. The process according to claim 15 further comprising subjecting the mixture to a vulcanizing and bridge-forming process.

* * * * *